(12) United States Patent
Gold et al.

(10) Patent No.: US 6,792,497 B1
(45) Date of Patent: Sep. 14, 2004

(54) SYSTEM AND METHOD FOR HARDWARE ASSISTED SPINLOCK

(75) Inventors: Anthony P. Gold, Exton, PA (US);
Duane J. McCrory, Malvern, PA (US);
Andrew F. Sanderson, Havertown, PA (US)

(73) Assignee: Unisys Corporation, Blue Bell, PA (US)

( * ) Notice: Subject to any disclaimer, the term of this patent is extended or adjusted under 35 U.S.C. 154(b) by 474 days.

(21) Appl. No.: 09/851,795

(22) Filed: May 9, 2001

Related U.S. Application Data

(60) Provisional application No. 60/254,837, filed on Dec. 12, 2000.

(51) Int. Cl.[7] ............................................... G06F 13/00
(52) U.S. Cl. ........................ 710/317; 710/200; 710/240; 710/264
(58) Field of Search ................................ 710/200, 240, 710/317; 709/216, 104; 711/170, 216

(56) References Cited

U.S. PATENT DOCUMENTS

| | | | | |
|---|---|---|---|---|
| 5,502,840 A | * | 3/1996 | Barton | 710/200 |
| 6,047,316 A | * | 4/2000 | Barton et al. | 709/216 |
| 6,567,873 B1 | * | 5/2003 | Henriksen | 710/240 |
| 6,578,131 B1 | * | 6/2003 | Larson et al. | 711/216 |

* cited by examiner

*Primary Examiner*—Khanh Dang
(74) *Attorney, Agent, or Firm*—Lisa A. Rode; Mark T. Starr; Woodcock Washburn LLC

(57) ABSTRACT

A crossbar structure for use in a multi-processor computer system to connect a plurality of processors to at least one shared resource. The crossbar structure comprises for each processor, a storage location for receiving from a respective processor a memory address of a lock control structure associated with the shared resource. When the processor needs to acquire a lock thereto, the crossbar structure, on behalf of the processor, performs memory operations on the lock control structure at the address specified in the storage location in order to acquire the lock on behalf of the processor.

45 Claims, 5 Drawing Sheets

SYSTEM AND METHOD FOR HARDWARE ASSISTED SPINLOCK

CROSS REFERENCE TO RELATED APPLICATIONS

This application claims priority of U.S. Provisional Application Serial No. 60/254,837 entitled "System And Method For Hardware Assisted Spinlock", filed Dec. 12, 2000, which is hereby incorporated by reference in its entirety.

FIELD OF THE INVENTION

The present invention generally relates to the field of multi-processor environments. More particularly, the present invention relates to the use of a hardware controller to handle spin lock requests.

BACKGROUND OF THE INVENTION

A multi-processor system includes a main memory, a shared resource, and processors interconnected via a bus. In a multi-processor system it is desired that some shared resources be locked to prevent other processors from utilizing that resource. A shared resource may be a portion of memory, an I/O device, or a register, for example. An I/O device may be locked to prevent other processors from using that I/O device, for example. To facilitate locking of a shared resource, a control structure is implemented in memory that comprises a lock bit. The shared resource may be locked by a processor to prevent other processors from using the shared resource until the processor with the lock, unlocks the shared resource.

In typical systems, to acquire a lock the processor executes a test and set instruction on the lock bit of the control structure corresponding to the resource for which the lock is being sought. This is a special sequence that allows a processor to acquire ownership of the lock. To gain ownership of a lock, the processor reads the current contents of the lock bit and writes a new value to the lock bit. The read and write operations to the lock bit are viewed by the system as a single operation that is non-interruptible.

If a processor reads an "unlocked" status from the lock bit during the test and set instruction, then that processor receives the lock for that resource. If the processor reads a "locked" status from the lock bit, then that processor does not receive the lock for that resource. If the processor does not receive the lock, the processor continually and repeatedly requests the lock using the test and set instruction described above. This is referred to as the processor "spinning on the lock," because the processor repeatedly requests the lock until it receives the lock. When a processor spins on a lock, it occupies bandwidth on the processor bus, because each time a processor performs a test and set operation on the memory control structure that includes the lock bit, the processor has to acquire exclusive ownership of that control structure in memory. Thus, when multiple processors are all spinning on the same lock, they are continuously passing the ownership of the portion of memory that constitutes the control structure back and forth across the bus.

Spin locks have several other disadvantages. First, the mechanisms used to acquire a lock are not always fair. When a lock is heavily contended, there is no guarantee that that all processors contending for the lock will eventually acquire the lock. Second, the mechanism used to acquire a lock is not ordered. As such, processors that are spinning on a lock will not necessarily get the lock in the order in which they began to spin on the lock. Third, when a lock is being heavily contended, a significant amount of system bus bandwidth is consumed performing the cache coherency operations necessary to move the read-write copy of the cache line containing the lock control structure between the contending processors. Cache coherency refers to the process of controlling read-write access to a particular cache line of data. In a multi-processor environment, while several processors may each contain a "copy" of a particular memory section of data, only one processor can have read-write access to that section of memory at one time. If one processor requests a read-write copy of data, all other processors (or caching agents) must give up their copies of the cache line. Cache coherency refers to this system of controlling revisions to memory and requires communication over a system bus.

Yet another disadvantage relates to the handling of interrupts. Interrupts are typically hardware signals that may stop a processor from performing one task, and have the processor begin processing a different task. Interrupts typically have an associated priority level. In this manner, in a conventional system, processors may be interrupted by an interrupt to handle a higher priority task. A processor typically records its current interrupt priority so that interrupts with lower priority may be redirected to another processor while the processor is servicing the higher priority task. However, while a processor is spinning on a lock, it may be able to handle some low priority tasks while waiting to receive the lock. In conventional systems, however, this is not possible.

The Microsoft Windows® 2000 operating system has identified many of the deficiencies with normal spin locks and has implemented queued spin locks in response to the noted deficiencies. However, the queued spin locks create other deficiencies. With a queued spin lock, it now takes more processor cycles to acquire and release a queued spin lock than a normal spin lock. Also, higher priority tasks (e.g., interrupts) should be masked while waiting to acquire a queued spin lock. This prevents the processor that has just been granted ownership of the lock from being preempted by an interrupt, which will cause additional spin lock delays on all the other processors that are waiting to acquire the same lock. However, by masking higher priority interrupts, system performance can be degraded because processors that are waiting deeper in the spin lock queue could potentially be allowed to service higher priority tasks.

Therefore, there is a need for a system and method that reduces processor traffic for spin locks, allows a processor that is spinning on a lock to handle low priority tasks while waiting for the lock, and allows for fairer allocation of locks. The present invention satisfies this need.

SUMMARY OF THE PRESENT INVENTION

The present invention is directed to a system and method in which hardware is added to a crossbar of a multiple processor (M) system to reduce processor bus traffic caused by spin locks. The added hardware takes over responsibility for requesting locks to shared resources, relieving the processors of the MP system from this task, and thereby minimizing cache coherency operations and reducing processor bus traffic.

A multiple processor computer system according to the present invention comprises a plurality of processors, a main memory, and a crossbar structure. One or more system resources may be shared, including without limitation portions of main memory, I/O devices, and registers. For certain shared resources, a control structure may be provided in main memory for controlling a lock on that resource. According to the invention, methods and apparatus are employed in the crossbar structure to handle acquisition of locks to the shared resources, thereby relieving the processors of the system of this task. In one embodiment, the crossbar structure comprises, for each processor, a lock register. The processor writes to the lock register an address of the lock control structure associated with a particular shared resource when the processor desires to acquire the lock thereto. The crossbar, on behalf of the processor, performs memory operations (e.g., test and set operation) on the lock control structure at the address specified in the lock register in order to acquire the lock on behalf of the processor. Thus, responsibility for performing the test and set operation on a lock control structure is moved from the processors to the crossbar structure.

According to another feature of the present invention, a crossbar structure comprises, for each processor, an unlock register. The processor writes to the unlock register an address of the lock control structure associated with a particular shared resource when the processor desires to acquire the lock thereto. The crossbar, on behalf of the processor, performs memory operations (e.g., writing a zero) on the lock control structure at the address specified in the lock register in order to release the lock on behalf of the processor.

According to yet another feature of the present invention, current and future interrupt priority registers may be implemented to allow a processor to service a lower level interrupt while spinning on a lock and return to the proper interrupt level upon receiving the lock.

According to a further feature of the present invention, a queue may be implemented to allow processors to have more fair access to shared resources.

Other features and advantages of the present invention will become evident hereinafter.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout the several views of the drawings, and wherein.

DETAILED DESCRIPTION OF THE INVENTION

Multi-Processor Environment

Figure 1:
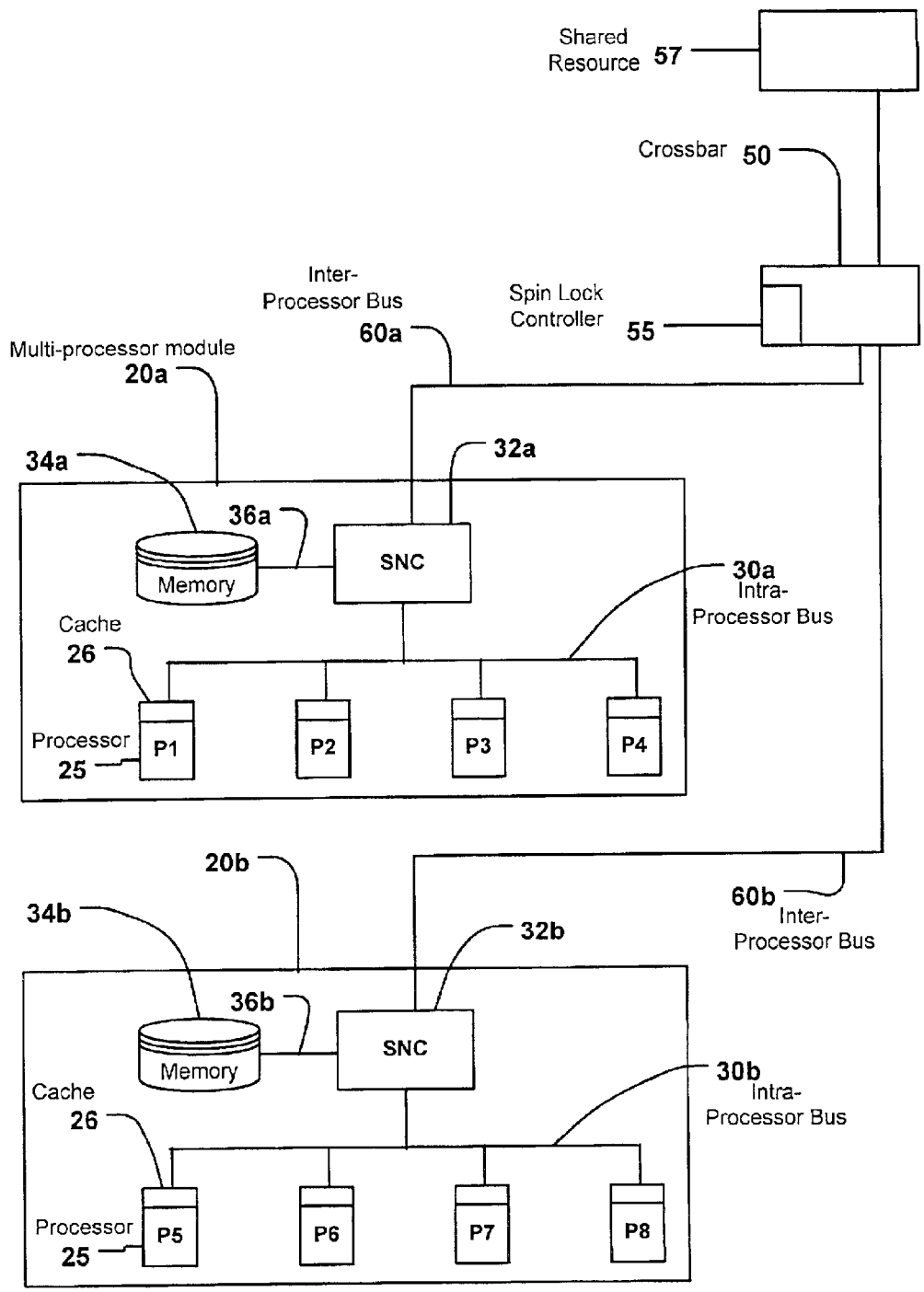
FIG. 1 is a block diagram of an exemplary multi-processor environment in connection with which the present invention may be employed.

Referring now to the drawings wherein like numerals indicate like elements throughout, there is shown in FIG. 1 a block diagram of an exemplary multi-processing (MP) computer system 10 in connection with which the present invention may be employed. It is understood, however, that the present invention is by no means limited to use in the illustrated MP computer system 10, but may be employed in any MP computer system.

As shown in FIG. 1, the MP computer system 10 includes a plurality of processors 25, at least one local memory 34, at least one crossbar 50, and at least one shared resource 57. The MP computer system 10 may include multi-processor modules, shown as MP modules 20a and 20b, commonly referred to herein as 20. Each MN module 20 may, for example, comprise a single printed circuit board. As shown in FIG. 1, MN module 20a includes processors P1 through P4, local memory 34a, and a scalable node controller (SNC) 32a. MP module 20b includes processors P5 through P8, a local memory 34b, and a SNC 32b. Memories 34a and 34b are commonly referred to as local memory 34 herein. SNC 32a and 32b are commonly referred to as SNC 32 herein. Memory bus 36a interconnects memory 34a and SNC 32a. Memory bus 36b interconnects memory 34b and SNC 32b.

The SNC 32 includes a bus interface to the processors, an internal memory, and a scalable interface controller (not shown). The SNC 32 coordinates processor requests for data from the local memory 34. Preferably, the MP modules are constructed in a way that each processor has fair and equal access to the same set of shared resources (e.g., shared resource 57 or local memory 34). Main memory comprises the local memories 34 on the MP modules 20. In this manner, the main memory is physically distributed across the MP modules 20. Main memory may store computer readable data and/or computer executable instructions.

In the MP module 20a, the processors P1 through P4 are interconnected by an intra-processor bus 30a. Intra-processor bus 30a is a high speed data connection that allows processors on the same MP module (e.g., processor P1 and processor P4 on MP module 20a) to communicate among each other and with the SNC 32a. MP module 20b includes an intra-processor bus 30b. Intra-processor buses 30a and 30b are commonly referred to as intra-processor bus 30 herein. The intra-processor-bus 30 is used to transport computer readable data and/or computer executable instructions among processors and memory.

In one embodiment, each processor 25 includes a cache 26, as shown in FIG. 1. A cache 26 typically is one or more random access memories (RAM)s and associated control logic internal (and sometimes external) to a processor 25 for holding "lines" of data typically comprising a predefined number of words. These RAMs, and the associated control logic, are called caches. Processors 25 utilize caches 26 to improve performance, since the data is "closer" to the processor and thus operates at higher access speeds than local memory 34. For example, if processor P1 needs particular data, and that particular data is in the cache of processor P1, the processor P1 does not have to make a request over the intra-processor bus 30a, rather it will use the data in the cache of processor P1. This not only reduces the time to get the data, but reduces communication traffic on the inter-processor bus 30. A device with a cache is referred to herein as a caching agent or a node.

The MP modules 20 are also connected via respective buses 60a and 60b, to the crossbar 50. The buses 60a and 60b are used to transport computer readable data and/or computer executable instructions among processors on different MP modules (e.g., between processor P1 on MP module 20a and processor P8 on MP module 20b).

The crossbar 50 includes a spin lock controller 55 described in more detail below. As used herein and in the claims, the term crossbar means a crossbar having the structure described in detail herein or any other hardware bridge or switch that provides an interface to all of the processors of the system. Typically the crossbar has a limited number of connection points, for example eight. However, multiple crossbars can be cascaded to handle more than the limit of connection points for one crossbar. The crossbar may include a memory interleave register (not shown) which defines how addresses are spread across the local memories of the MN modules.

The shared resource 57 may comprise a portion of memory, an I/O device, a register, or any computer resource shared by processors in a MP computer system. The shared resource 57 is connected to the crossbar 50 to allow processors to access the shared resource 57. However, the shared resource 57 may be connected to the MP computer system in any manner allowing processors access to the shared resource. As used herein and in the claims, the term "shared resource" means any computing resource in a MP computer system that is shared by multiple processors.

Cache Lines

In order to make memory data transfers more efficient, most MP computer systems organize memory into multiple byte units. Typically, a cache line within a processor cache is equal in size to the size of the multiple byte unit. The caches can be thought of as holding cells for data that would normally reside in main memory.

A caching agent (i.e., any system component that caches data) may have a read-write copy of a cache line. If a caching agent has a read-write copy, the caching agent has permission to read from and write to the cache line. In this case, the caching agent is considered to have exclusive ownership of the cache line, and is also referred to as the owning node of that cache line. Alternatively, a caching agent may have a read-only copy of a cache line. If a caching agent has a read-only copy, the caching agent has permission to read the cache line, but not to write to the cache line. This is often referred to as "shared" ownership (i.e., if one or more caching agents have a read only copy of a cache, the caching agent(s) are said to share the cache line.)

Cache Line Coherency

In order to logically share resources and produce the desired results, coordination mechanisms are added to the MP computer system. For input/output operations this coordination is typically done in software using an operating system and device drivers. For memory operations this coordination is typically done in hardware through a mechanism called cache coherency.

In an MP computer system, there are multiple processors and thus there usually are multiple caches. The rules for defining how caches are maintained coherent with each other and main memory, and consistent with the software intention (as defined by the instruction code sequence) are referred to as cache coherency.

The typical rules for maintaining coherency of cache lines are as follows:

Only one caching agent is allowed to modify the contents of a cache line at a time.

If a caching agent has been given the right to modify the cache line (i.e., a read-write copy of the cache line) then no other copy of the cache line shall exist in any other cache.

Multiple copies of a cache line may exist in multiple caching agents as long as they are all read-only copies.

System and Method for Hardware Assisted Spin Lock

Figure 2:
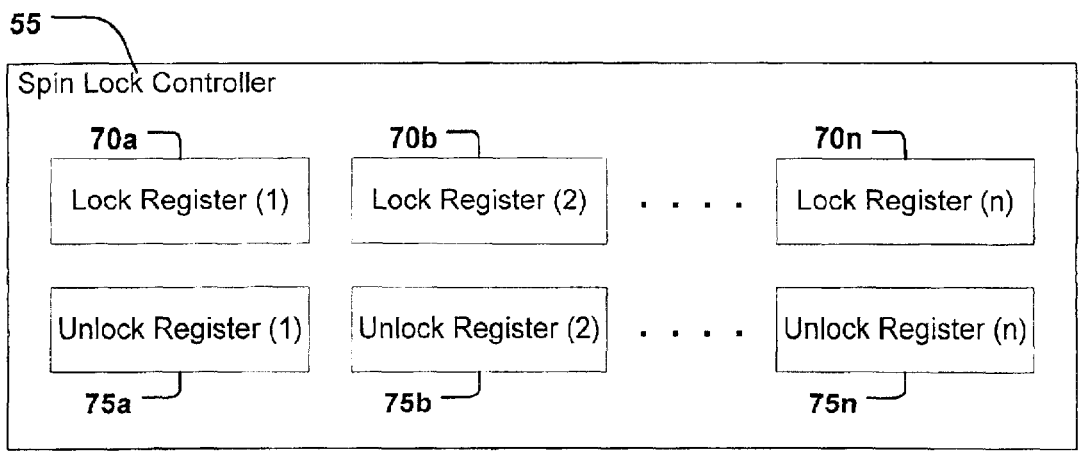
FIG. 2 is a block diagram of lock registers in a spin lock controller in accordance with the present invention.

FIG. 2 shows a block diagram of registers in an exemplary spin lock controller in accordance with the present invention. As shown in FIG. 2, the spin lock controller 55 includes one lock register (e.g., Lock Register (1), shown as element 70*a*, through Lock Register (n), shown as element 70*n*) and one unlock register (e.g., Unlock Register (1), shown as element 75*a*, through Unlock Register (n), shown as element 75*n*) for each of n processors in the MP system 10. For example, in the MP system 10 of FIG. 1, the spin lock controller 55 would have eight lock registers (e.g., Lock Register (1) through Lock Register (8)) and eight unlock registers (e.g., Unlock Register (1) through Unlock Register (8)).

The Lock Registers 70 are used to store the memory address of a lock control structure associated with a shared resource for which the corresponding processor desires to obtain a lock. When a processor desires to obtain a lock on a particular shared resource, the processor writes the address of the corresponding lock control structure into its respective Lock Register 70 in the spin lock controller 55. The spin lock controller 55 then obtains the lock for the processor, rather than the processor directly obtaining the lock, as described in more detail below. Specifically, the spin lock controller 55 performs a test and set operation on the lock control structure on behalf of the processor. When the processor is ready to relinquish its lock on that particular resource, the processor writes the address of the lock control structure into its respective Unlock Register 75. Again, the spin lock controller 55 handles the relinquishment of the lock on behalf of the processor.

Figure 3:
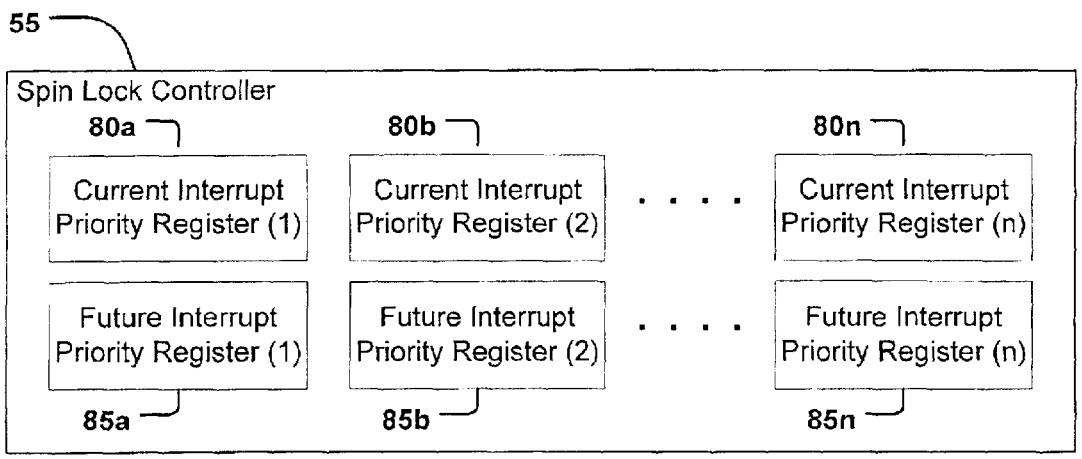
FIG. 3 is a block diagram of optional interrupt registers in a spin lock controller in accordance with the present invention.

FIG. 3 shows a block diagram of optional registers in an exemplary spin lock controller in accordance with the present invention. As shown in FIG. 3, these optional registers comprise one Current Interrupt Priority Register (e.g., Current Interrupt Priority Register (1), shown as element 80*a*, through Current Interrupt Priority Register (n), shown as element 80*n*) and one Future Interrupt Priority Register (e.g., Future Interrupt Priority Register (1), shown as element 85*a*, through Future Interrupt Priority Register (n), shown as element 85*n*) for each of n processors in the MP system 10. For example, in the MP system 10 of FIG. 1, the spin lock controller 55 would have eight Current Interrupt Priority Registers (e.g., Current Interrupt Priority Register (1) through Current Interrupt Priority Register (8)) and eight Future Interrupt Priority Registers (e.g., Future Interrupt Priority Register (1) through Future Interrupt Priority Register (8)).

Each Current Interrupt Priority Register 80 holds the interrupt level on which its respective processor is currently operating and which is indicative of the level of interrupt that the processor will service when spinning on a lock. Each Future Interrupt Priority Register 85 holds the interrupt level that its respective processor will undertake after acquiring the lock on which the processor was spinning. These registers are used to enable a processor to operate at a low interrupt priority level while it is waiting to acquire a lock, and then to automatically jump to a higher interrupt priority level once the lock is acquired. In a system where there is a lot of contention for locks, this frees the processors that are waiting to acquire a lock and makes them available to service interrupts that they would otherwise be blocked from servicing, as they are busy waiting.

For example, if a processor requests a lock and will operate at an interrupt priority level of five upon receiving the lock, the processor may set the corresponding Future Interrupt Priority Register to five and set the corresponding Current Interrupt Priority Register to ten. In this manner, the processor may service interrupts with a priority higher than ten while waiting to receive the lock. Upon receiving the lock the processor will undertake an interrupt priority of five.

Figure 4:
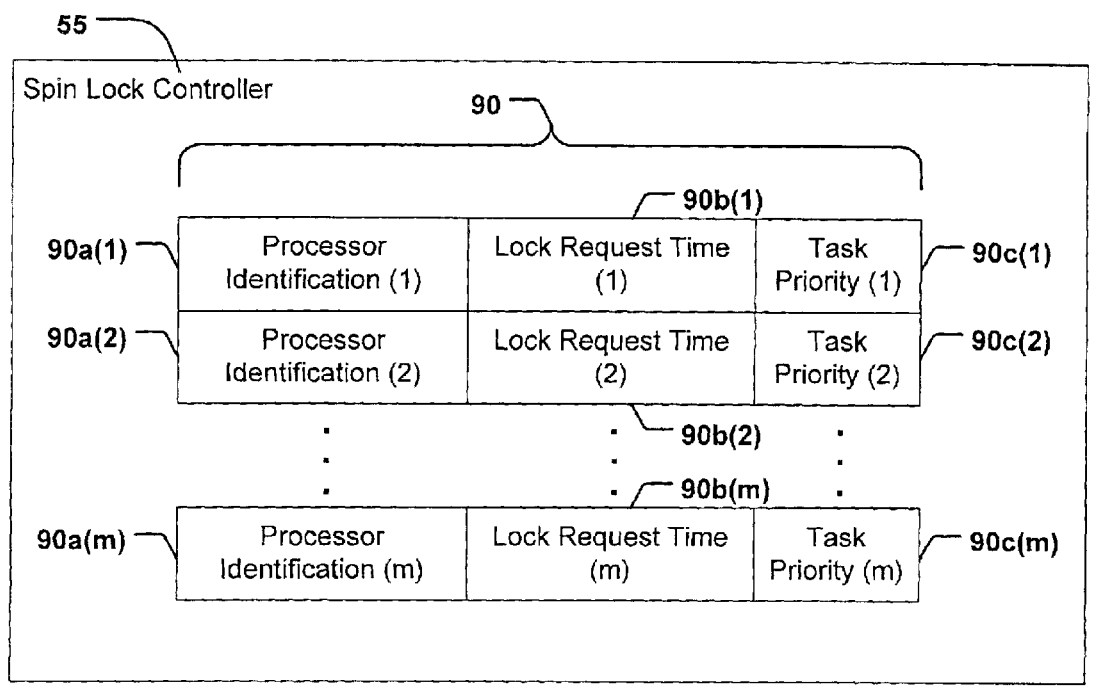
FIG. 4 is a block diagram of an optional queue in a spin lock controller in accordance with the present invention.

FIG. 4 illustrates an optional queue in an exemplary spin lock controller in accordance with the present invention. As shown in FIG. 4, the spin lock controller 55 comprises a queue 90 for processing spin lock requests. The queue 90 may be implemented in the hardware spin lock controller 55 to determine which processor will be granted a particular lock first.

In one embodiment, queue 90 comprises a processor identification field 90a, a lock request time field 90b, and a task priority field 90c for each lock request. Processor identification field 90a contains an identification of a processor that has requested a lock. Lock request time field 90b contains a time that a processor has requested lock and task priority field 90c contains a priority of a task that has requested a lock.

If several processors are spinning on a lock, then spin lock controller 55 may then use queue 90 to determine which processor will be granted the lock upon a processor releasing the lock. In the present embodiment, spin lock controller 55 selects the highest priority from priority fields 90c of queue 90. The processor identified in processor identification field 90a corresponding to the highest priority from priority fields 90c of queue 90 is granted the lock. If more than one priority fields 90c has the same priority, spin lock controller then determines which processor receives the lock according to the lock request time field 90b. In this case, the processor having the oldest lock request time is granted the lock.

In another embodiment, spin lock controller 55 selects the oldest time from lock request time field 90b of queue 90. The processor identified in processor identification field 90a corresponding to the oldest time from lock request time field 90b of queue 90 is granted the lock.

In this manner, the spin lock process can be made more fair, and/or can be made to guarantee that a processor that requests a lock, eventually receives that lock. To ensure a timely acquire of the lock by the queue selected processor a messaging interface may be required to inform the processor that it has just been granted the lock.

In greater detail, with the queue 90, the spin lock controller 55 may be designed to recognize when two processors are contending for the same lock address and ensure that when the lock is released, the processor that first requested the lock, as viewed by the spin lock controller 55, will be granted ownership of the lock. This will provide 'fair' access to locks, guaranteeing that all processors that are contending for a lock are eventually given ownership of the lock and that ownership of the lock will be passed from processor to processor based on the order the lock was requested, as viewed by the spin lock controller.

Figure 5:
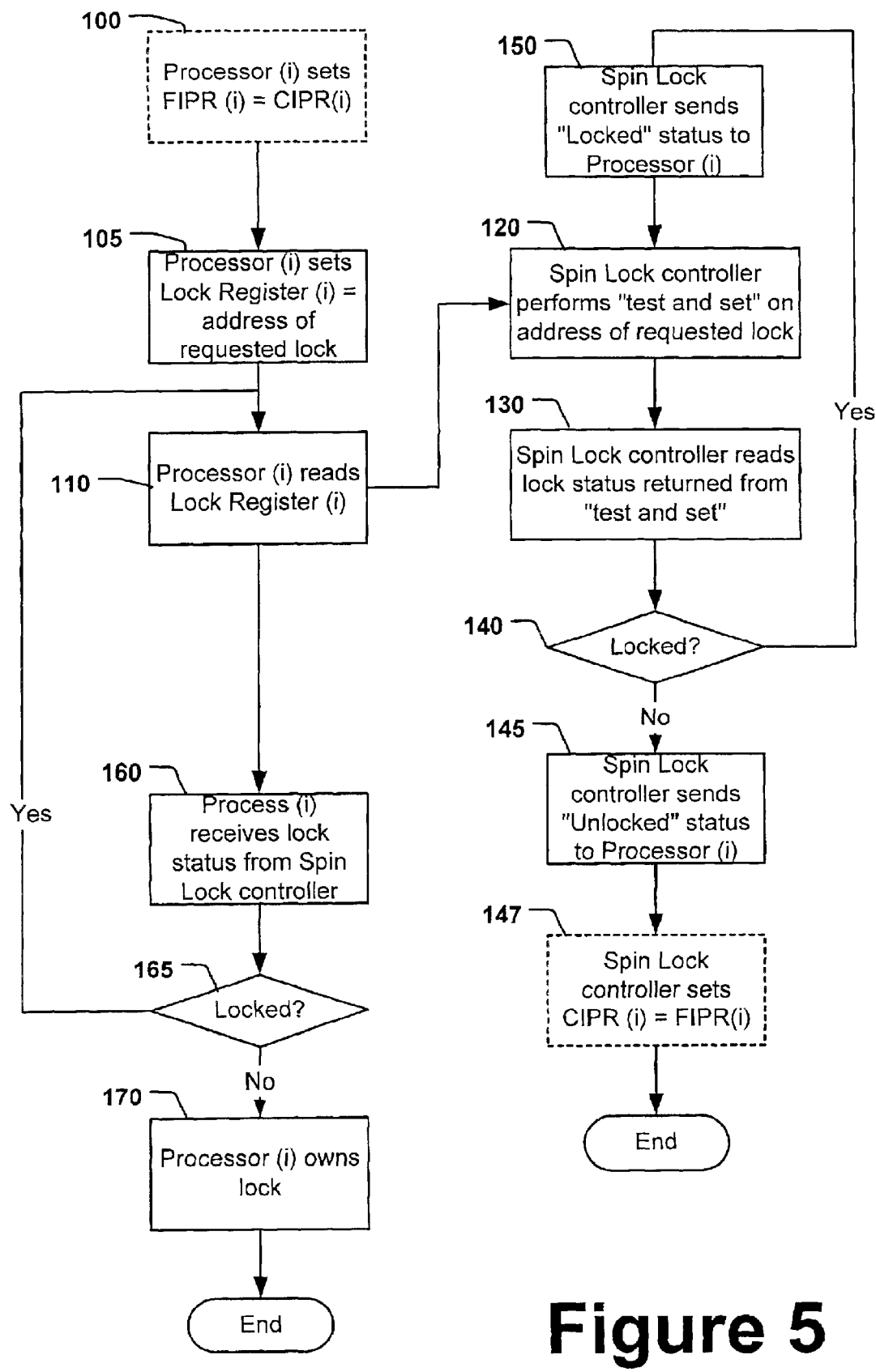
FIG. 5 is a flow chart showing details of an embodiment of the present invention.

FIG. 5 is a flow chart showing details of an embodiment of the present invention. As shown in FIG. 5, at optional step 100, when a processor (e.g., processor (i)) wants to acquire a lock it may optionally first copy the value of the Current Interrupt Priority Register(i) to the Future Interrupt Priority Register(i). In this manner, the Future Interrupt Priority Register(i) contains the value of interrupt that the processor will undertake upon receiving the lock and the Current Interrupt Priority Register(i) may be set to another value representing the level of interrupt that the processor will service while spinning on the lock. Therefore, by storing the value of the Current Interrupt Priority Register(i) into the Future Interrupt Priority Register(i), a processor is enabled to operate at a low interrupt priority level while it is waiting to acquire a lock, and then to automatically jump to a higher interrupt priority level once the lock is acquired.

At step 105, the processor then writes the memory address of the lock control structure associated with the shared resource for which the lock is to be acquired to Lock Register(i). At step 110, the processor then issues a read of Lock Register(i).

Whenever the processor executes a read of the Lock Register, (i.e., the address of the lock control structure), as shown at step 110, the spin lock controller 55 performs a test and set instruction on the memory address to which the Lock Register points, as shown in step 120. Thus, in the present invention, the spin lock controller 55 performs the test and set operations on the memory address of the lock structure, relieving the processor of this task. This reduces the memory bandwidth that would be consumed in a conventional system where multiple processors are spinning on the same lock. The test and set instruction has in effect been executed in the spin lock controller 55, and exclusive ownership of the cache line containing the lock control structure does not have to be acquired by the processor. Rather, exclusive ownership of that cache line is always acquired by the spin lock controller 55 which then passes a simple lock status indication to the processor requesting the lock. Thus, the burden of the test and set instruction is moved from the processor to the spin lock controller.

At step 130, the spin lock controller reads a status returned from the test and set instruction.

At step 140, the spin lock controller 55 responds based on the status returned from the test and set instruction. If the test and set instruction returns a "locked" status (i.e., that another processor currently has the lock), the spin lock controller returns this status to the processor, as shown at step 150. The spin lock controller will continue to "spin" on the lock and perform test and set instructions on behalf of the processor until receiving the lock for the processor.

If the test and set instruction returns a "unlocked" status, the spin lock controller sets the lock to indicate that the requesting processor has now acquired the lock and reports this to the requesting processor, as shown at step 145. At step 147, the spin lock controller may optionally copy the value in the Future Interrupt Priority Register(i) into the Current Interrupt Priority Register(i). By storing the value of the Future Interrupt Priority Register(i) into the Current Interrupt Priority Register(i), the processor begins operating at the interrupt level which the processor desired to operate at, upon receiving the lock.

At step 160, the processor receives the lock status from the spin lock controller 55. At step 165, the processor responds based on the value returned from the spin lock controller 55.

If the processor receives a "locked" status, the processor will continue to spin on the lock to the spin lock controller by reading the Lock Register 70 at step 110. Thus, the processor spins to the spin lock controller 55 rather than to the memory and reads the lock register rather than performing a test and set operation on the memory address. This cuts bus traffic approximately in half by avoiding having a processor spin to main memory. Additionally, when several processors are spinning on the same lock, the processors spin to the hardware spin lock controller 55 which performs the necessary memory operations (e.g., test and set) on the lock control structure on behalf of the processors. As such, there is no need for the processors to obtain exclusive ownership of the cache line(s) that contain the lock control structure, and therefore, cache coherency operations are minimized. In the present embodiment, the Lock Register 70 and the Unlock Register 75 are memory mapped registers and therefore are accessed through un-cached memory mapped read/write operations.

At step 165, if the processor receives an "unlocked" status, the processor now owns the lock and may utilize the shared resource requested, as shown at step 170.

Figure 6:
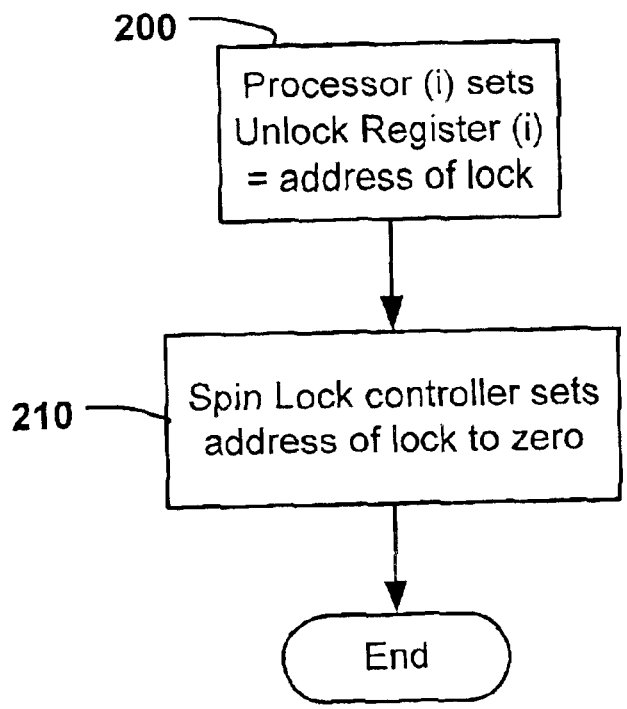
FIG. 6 is a flow chart showing further details of an embodiment of the present invention.

FIG. 6 is a flow chart showing details of another embodiment of the present invention. As shown in FIG. 6, at step 200, when a processor (e.g., processor (i)) wants to release a lock, the processor(i) writes the address of the lock into the Unlock Register (i). The spin lock controller 55 then releases the lock, for example, by writing a zero to the memory address to which the Unlock Register (i) points. Thus, the spin lock controller 55 releases the lock on behalf of the processor.

As the foregoing illustrates, the present invention meets the need for a system and method that reduces processor traffic associated with spin locks, allows a processor that is spinning on a lock to handle low priority tasks while waiting for the lock, and allows for a more fair allocation of locks.

It is noted that the foregoing examples have been provided merely for the purpose of explanation and are in no way to be construed as limiting of the present invention. While the invention has been described with reference to exemplary embodiments, it is understood that the words which have been used herein are words of description and illustration, rather than words of limitation. Further, although the invention has been described herein with reference to particular structure, methods, materials, and embodiments, the invention is not intended to be limited to the particulars disclosed herein; rather, the invention extends to all structures, methods and uses that are within the scope of the appended claims. For example, while the invention is described above as being implemented in the hardware of a multi-processor computer system crossbar, in other embodiments, a combination of hardware and software may be employed. Specifically, the functionality described above can be implemented in software on a hardware bridge (the crossbar 50 being one form of hardware bridge), provided that the hardware bridge has access to all of the processors of the system. In such an embodiment, the software functionality may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a processor, the processor becomes an apparatus for practicing the invention. When implemented on a general-purpose processor, the program code combines with the processor to provide a unique apparatus that operates analogously to specific logic circuits. Those skilled in the art, having the benefit of the teachings of this specification, may effect numerous other modifications thereto and changes may be made without departing from the scope and spirit of the invention, as defined by the appended claims.

What is claimed is:

1. A multiple processor computer system comprising:
   a plurality of processors;
   a shared resource;
   a main memory in communication with the plurality of processors, at least a portion thereof comprising a control structure for controlling a lock on said shared resource; and
   a crossbar structure connecting the plurality of processors to the shared resource for controlling access among the processors to the shared resource, the crossbar structure comprising:
   for each processor, a corresponding first storage location, one of the plurality of processors writing to a first storage location corresponding to the one processor, an address of the lock control structure associated with said shared resource to acquire the lock thereto, the crossbar structure, on behalf the one processor, performing memory operations on the lock control structure at the address specified in the corresponding first storage location in order to acquire the lock on behalf of the one processor;
   a second storage location corresponding to a respective processor in the multi-processor system, one of the plurality of processors writing to the corresponding second storage location an address of the lock control structure associated with said shared resource to release the lock thereto, the crossbar structure, on behalf of the processor, performing memory operations on the lock control structure at the address specified in the corresponding second storage location in order to release the lock on behalf of the processor; and
   a third storage location corresponding to a respective processor in the multi-processor system for storing a current interrupt priority level associated with the processor wherein the current interrupt priority level represents the level of interrupt that the processor will service while spinning on a lock.

2. The multiple processor computer system of claim 1 wherein the crossbar structure further comprises a forth storage location corresponding to a respective processor in the multi-processor system for storing a future interrupt priority level associated with the processor wherein the future interrupt priority level represents the level of interrupt that the processor will operate at upon receiving a lock.

3. The multiple processor computer system of claim 1 wherein the crossbar structure further comprises a queue for determining which processor is granted a lock.

4. A multiple processor computer system comprising:
   a plurality of processors;
   a shared resource;
   a main memory in communication with the plurality of processors, at least a portion thereof comprising a control structure for controlling a lock on said shared resource; and
   a crossbar structure connecting the plurality of processors to the shared resource for controlling access among the processors to the shared resource, the crossbar structure comprising:
   for each processor, a corresponding storage location, one of the plurality of processors writing to a storage location corresponding to the one processor, an address of the crossbar structure, on behalf of the one processor, performing memory operations on the lock control structure at the address specified in the corresponding storage location in order to acquire the lock on behalf of the one processor; and,
   a queue for determining which processor is granted a lock, wherein the queue comprises a plurality of entries, each entry comprising a first data field for containing a processor identification, a second data field for containing a lock request time, and a third data field for containing a priority of a request for a lock.

5. The multiple processor computer system of claim 4 wherein each request for a lock on the shared resource has a corresponding entry in the queue, and wherein the crossbar structure determines which request is granted the lock based at least in part upon the respective priorities contained in the third data fields of the queue entries for each request.

6. The multiple processor computer system of claim 5 wherein if the third data fields of more than one of the queue entries contains the same and highest priority, the crossbar structure further determines which request is granted the lock based upon the respective lock request times contained in the second data fields of those queue entries.

7. The multiple processor computer system of claim 1 further comprising a multi-processor module.

8. The multiple processor computer system of claim 7 wherein the multi-processor module comprises at least two of the plurality of processors.

9. The multiple processor computer system of claim 1 wherein the shared resource comprises at least a portion of memory.

10. The multiple processor computer system of claim 1 wherein the shared resource comprises an I/O device.

11. The multiple processor computer system of claim 1 wherein the shared resource comprises a register.

12. A crossbar structure for use in a multi-processor computer system to connect a plurality of processors to at least one shared resource, the crossbar structure comprising for each processor:

a corresponding second storage location for receiving from the respective processor a memory address of a lock control structure associated with said shared resource, wherein to release a lock thereto, the crossbar structure, on behalf of a processor, performs memory operations on the lock control structure at the address specified in the corresponding second storage location in order to release the lock on behalf of the processor, and, a corresponding third storage location for receiving from the respective processor a current interrupt priority level associated with the processor wherein the current interrupt priority level represents the level of interrupt that the processor will service while spinning on a lock.

13. The crossbar structure of claim 12 further comprising:

for each processor, a corresponding fourth storage location for storing a future interrupt priority level associated with the processor wherein the future interrupt priority level represents the level of interrupt that the processor will operate upon receiving a lock.

14. The crossbar structure of claim 12 further comprising a queue for determining which processor is granted a lock.

15. A crossbar structure for use in a multi-processor computer system to connect a plurality of processors to at least one shared resource, the crossbar structure comprising:

for each processor, a corresponding storage location for receiving from the respective processor a memory address of a lock control structure associated with said shared resource; wherein to acquire a lock thereto, the crossbar structure, on behalf of a processor, performs memory operations on the lock control structure at the address specified in the corresponding storage location in order to acquire the lock on behalf of the processor; and, a queue for determining which processor is granted a lock, wherein the queue comprises a plurality of entries, each entry comprising a first data field for containing a processor identification, a second data field for containing a lock request time, and a third data field for containing a priority of a request for a lock.

16. The crossbar structure of claim 15 wherein each request for a lock on the shared resource has a corresponding entry in the queue, and wherein the crossbar structure determines which request is granted the lock based at least in part upon the respective priorities contained in the third data fields of the queue entries for each request.

17. The crossbar structure of claim 16 wherein if the third data fields of more than one of the queue entries contains the same and highest priority, the crossbar structure further determines which request is granted the lock based upon the respective lock request times contained in the second data fields of those queue entries.

18. A method for acquiring a lock to a shared resource in a multiprocessor computer system, the multiprocessor computer system comprising a plurality of processors, a main memory, and a crossbar structure comprising, for each processor, a first storage location for storing a memory address of a control structure associated with said shared resource to be locked, the method comprising:

writing, by one of said processors, the memory address of said control structure to said first storage location corresponding to said one processor when said one processor needs to acquire a lock on said shared resource;

performing, by said crossbar structure, on behalf of said one processor, a memory operation on the control structure at the memory address stored in said corresponding first storage location in an attempt to acquire a lock to said shared resource;

returning a status of the memory operation to said one processor; and, storing a current interrupt priority level associated with said one processor wherein the current interrupt priority level represents the level of interrupt that said one processor will service while spinning on a lock.

19. The method of claim 18 wherein performing a memory operation comprises performing a test and set operation.

20. The method claim 18 further comprising storing a future interrupt priority level associated with said one processor wherein the future interrupt priority level represents the level of interrupt that said one processor will service upon receiving a lock.

21. The method of claim 20 further comprising a comprising a determining a processor from the plurality of processors to be granted a lock based on a queue.

22. The method of claim 21 wherein determining a processor further comprises:

reading at least one priority field and a processor identification corresponding to each priority field, from the queue;

determining that more than one priority field contains the same and highest priority;

reading a time field corresponding to each priority field containing the same and highest priority;

determining a processor based on the processor identification corresponding to the earliest time in the fields; and granting the lock to the determined processor corresponding to the earliest time in the time fields.

23. The method of claim 21 wherein the determining a processor further comprises:

reading at least one priority and a processor identification corresponding to each priority, from the queue;

selecting the highest priority of the read at least one priority;

determining a processor based on the processor identification corresponding the selected highest priority; and granting the lock to the determined processor corresponding to the selected highest priority.

24. The method of claim 20 wherein storing the future interrupt priority level further comprises copying a value contained in a current interrupt priority register to a future interrupt priority register prior to writing, one of said processors, the memory address.

25. The method of claim 24 further comprising copying a value contained in a future interrupt priority register to a current interrupt priority register.

26. A method for use in a multi-processor computer system having a crossbar structure that connects a plurality of processors to at least one shared resource, the method comprising:

receiving at the crossbar form one of said processors, a memory address of a lock control structure associated with said shared resource when the processor needs to acquire a lock thereto;

performing at the crossbar structure, on behalf of said one processor, a memory operation on the lock control structure at the memory address received from said one processor in order to acquire the lock on behalf of said one processor, and, performing at the crossbar structure memory operations on the lock control structure at the memory address received from said one processor, continually, until an unlock status is received.

27. The method of claim 26 further comprising storing the memory address received from said one processor in a respective storage location within the crossbar structure.

28. The method of claim 26 further comprising determining a status of the lock control structure at the memory address received from said one processor.

29. The method of claim 28 further comprising sending to said one processor the determined status of the lock control structure.

30. The method of claim 26 wherein performing a memory operation comprises performing a test and set operation.

31. The method of claim 26 further comprising a receiving a current interrupt priority level associated with said one processor wherein the current interrupt priority level represents the level of interrupt that said one processor will service while spinning on a lock.

32. The method of claim 26 further comprising storing a future interrupt priority level associated with said one processor wherein the future interrupt priority level represents the level of interrupt that said one processor will service upon receiving a lock.

33. The method of claim 26 further comprising determining a processor from the plurality of processors to be granted a lock based on a queue.

34. A method for use in a multi-processor computer system having a crossbar structure that connects a plurality of processors to at least one shared resource, the method comprising:

receiving at the crossbar from one of said processors, a memory address of a lock control structure associated with said shared resource when the processor needs to acquire a lock thereto;

performing at the crossbar structure, on behalf of said one processor, a memory operation on the lock control structure at the memory address received from said one processor in order to acquire the lock on behalf of said one processor, and, determining a processor from the plurality of processors to be granted a lock based on a queue, wherein the determining a processor further comprises:

reading at least one priority and a processor identification corresponding to each priority, from the queue;

selecting the highest priority of the read at least one priority;

determining a processor based on the processor identification corresponding the selected highest priority; and granting the lock to the determined processor corresponding to the selected highest priority.

35. A computer-readable having instructions stored thereon for use in a multi-processor computer system having a crossbar structure that connects a plurality of processors to at least one shared resource, the instructions, when executed on the crossbar structure, causing the crossbar structure to perform the following:

receiving at the crossbar from one of said processors, a memory address of a lock control structure associated with said shared resource when the processor needs to acquire a lack thereto;

performing at the crossbar structure, on behalf of said one processor, a memory operation on the lock control structure at the memory address received from said one processor in order to acquire the lock on behalf of said one processor, and receiving a current interrupt priority level associated with said one processor wherein the current interrupt priority level represents the level of interrupt that said one processor will service while spinning on a lock.

36. The computer-readable medium of claim 35 wherein the instructions further cause the crossbar to perform storing the memory address received from said one processor in a respective storage location within the crossbar structure.

37. The computer-readable medium of claim 35 wherein the instructions further cause the crossbar to perform determining a status of the lock control structure at the memory address received from said one processor.

38. The computer-readable medium of claim 37 wherein the instructions further cause the crossbar to perform sending to said one processor the determined status of the lock control structure.

39. The computer-readable medium of claim 35 wherein the instructions further cause the crossbar to perform performing at the crossbar structure memory operations on the lock control structure at the memory address from said one processor, continually, until an unlocked status is received.

40. The computer-readable medium of claim 35 wherein performing a memory operation comprises performing a test and set operation.

41. The computer-readable medium of claim 35 wherein the instructions further cause the crossbar to perform storing a future interrupt priority level associated with said one processor wherein the future interrupt priority level represents the level of interrupt that said one processor will service upon receiving a lock.

42. The computer-readable medium of claim 35 wherein the instructions further cause the crossbar to perform determining a processor from the plurality of processors to be granted a lock based on a queue.

43. A computer-readable medium having instructions stored thereon for use in a multi-processor computer system having a crossbar structure that connects a plurality of processors to at least one shared resource, the instructions, when executed on the crossbar structure, causing the crossbar structure to perform the following:

receiving at the crossbar from one of said processors, a memory address of a lock control structure associated with said shared resource when the processor needs to acquire a lock thereto;

performing at the crossbar structure, on behalf of said one processor, a memory operation on the lock control structure at the memory address received from said one processor in order to acquire the lock on behalf of said one processor; and, determining a processor from the plurality of processors to be granted a lock based on a queue, wherein the determining a processor further comprises:

reading at least one priority and a processor identification corresponding to each priority, from the queue;

selecting the highest priority of the read at least one priority;

determining a processor based on the processor identification corresponding the selected highest priority; and granting the lock to the determined processor corresponding to the selected highest priority.

44. A method for use in a multi-processor computer system having a crossbar structure that connects a plurality of processors to at least one shared resource, the method comprising:

receiving at the crossbar from one of said processors, a memory address of a lock control structure associated with said shared resource when the processor needs to acquire a lock thereto;

performing at the crossbar structure, on behalf of said one processor, a memory operation on the lock control structure at the memory address received from said one processor in order to acquire the lock on behalf of said one processor; and, determining a processor from the plurality of processors to be granted a lock based on a queue, wherein determining a processor further comprises:

reading at least one priority field and a processor identification corresponding to each priority field, from the queue;

determining that more than one priority field contains the same and highest priority, reading a time field corresponding to each field containing the same and highest priority;

determining a processor based on the processor identification corresponding the earliest time in the time fields; and granting the lock to the determined processor corresponding to the earliest time in the time fields.

45. A computer-readable medium having instructions stored thereon for use in a multi-processor computer system having a crossbar structure that connects a plurality of processors to at least one shared resource, the instructions, when executed on the crossbar structure, causing the crossbar structure to perform the following:

receiving at the crossbar from one of said processors, a memory address of a lock control structure associated with said shared resource when the processor needs to acquire a lock thereto; and performing at the crossbar structure, on behalf of said one processor, a memory operation on the lock control structure at the memory address received from said one processor in order to acquire the lock on behalf of said one processor; and, determining a processor from the plurality of processors to be granted a lock based on a queue, wherein determining a processor further comprises:

reading at least one priority field and a processor identification corresponding to each priority field, from the queue;

determining that more than one priority field contains the same and highest priority;

reading a time field corresponding to each priority field containing the same and highest priority;

determining a processor based on the processor identification corresponding the earliest time in the time fields; and granting the lock to the determined processor corresponding to the earliest time in the time fields.

\* \* \* \* \*